(12) United States Patent
Alessio et al.

(10) Patent No.: US 6,618,092 B2
(45) Date of Patent: Sep. 9, 2003

(54) HOUSING FOR CLOSED CIRCUIT TELEVISION CAMERA

(75) Inventors: Grotto Alessio, Schio (IT); Menegotto Fabio, Schio (IT)

(73) Assignee: Videotec S.r.L., Schio (IT)

( * ) Notice: Subject to any disclaimer, the term of this patent is extended or adjusted under 35 U.S.C. 154(b) by 0 days.

(21) Appl. No.: 10/095,286

(22) Filed: Mar. 11, 2002

(65) Prior Publication Data

US 2002/0140847 A1 Oct. 3, 2002

(30) Foreign Application Priority Data

Mar. 27, 2001 (IT) ...................................... VI2001A0073

(51) Int. Cl.[7] .......................... H04N 5/225; H04N 7/18; H04N 9/47
(52) U.S. Cl. ........................ 348/373; 348/373; 348/374; 348/143
(58) Field of Search ................................. 348/373, 374, 348/143, 151, 208; D16/208

(56) References Cited

U.S. PATENT DOCUMENTS

| 3,879,742 A | * | 4/1975 | Smith | 348/143 |
| 4,414,576 A | * | 11/1983 | Randmae | 348/373 |
| 5,115,263 A | * | 5/1992 | Bernhardt et al. | 348/143 |
| 5,966,176 A | * | 10/1999 | Chow et al. | 348/143 |

* cited by examiner

Primary Examiner—Wendy R. Garber
Assistant Examiner—Justin Misleh
(74) Attorney, Agent, or Firm—Bucknam and Archer

(57) ABSTRACT

A housing for a closed circuit television camera is constituted by a wrapper or a container, in the interior of which are located in addition to the television camera which is the relative object, a feeder, a heat dissipator ventilator for cooling, and other components, as well as the necessary electrical connections between the several components and the external connection. The housing is characterized by the fact that it is constituted by two parts which are counterposed and approached one to the other. The upper part has essentially a convex configuration while the lower part has essentially a planar configuration.

3 Claims, 1 Drawing Sheet

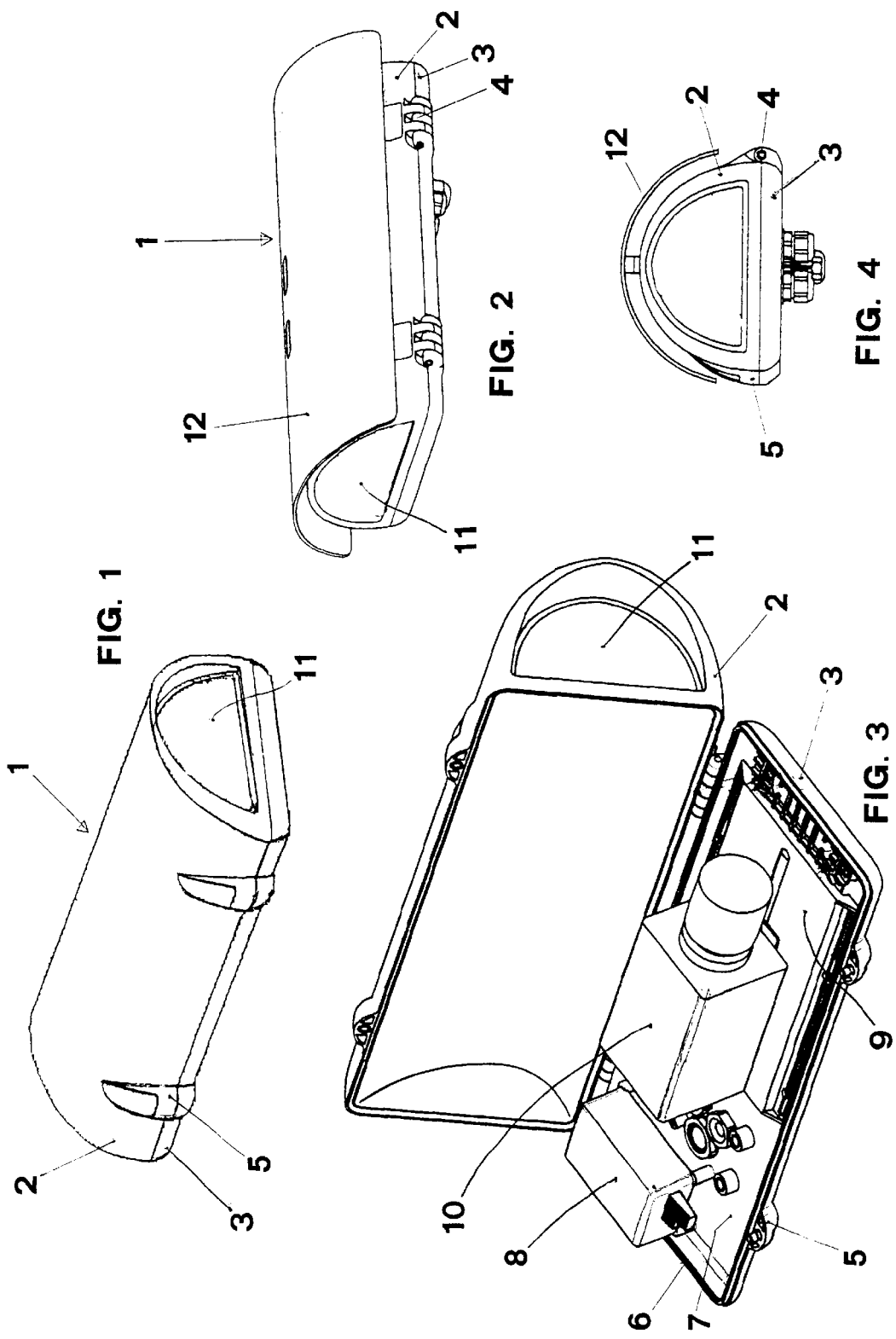

HOUSING FOR CLOSED CIRCUIT TELEVISION CAMERA

FIELD OF THE INVENTION

This invention relates to a housing for a closed circuit television camera.

BACKGROUND OF THE INVENTION

The use of television cameras is well known in all environments, both civilian and industrial, usually inserted in a closed circuit and assigned to indirectly broadcast determined spaces or to keep under control specific apparatus. By way of example television cameras have been placed at the exterior of buildings and intended to control admittance, the doors, the gates and other accesses. These apparatus are essentially constituted by a covering or container, defined with the generic term "housing", in the interior of which are located in addition to the television camera being the relative object, which is of minimum dimensions and is mounted on a slide, also a feeder, heat dissipator ventilator for cooling, and the necessary electrical connections between the several internal components and the external connection.

At the present state of the art, the housing is made of anticorrosive metal or technopolymer with high impact resistance, is constituted by two half covers which are counterposed and reciprocally anchored. The reciprocal hooking the two half covers occurs by means of a longitudinal groove or by means of a lateral longitudinal hinging so as to achieve an opening as in a book.

Constructively, all the internal components of the housing rest and are fixed on the lower half cover while the upper half cover has only a closure function.

This constructive configuration has some drawbacks, both constructive as well as in use. In fact, because of the configuration, which is more or less concave but always depressed, of the internal base of the lower half cover, the assembly of the several components on the base is difficult and requires a long time for mounting. In addition, these components after they are fixed, are difficult to access for the operator who must carry out the operation of installation and maintenance, such as adjustment of the television camera focus or the substitution of pieces, all these matters becoming worse due to the fact that these operations are carried out by the operator under difficult conditions, for instance on a ladder or a provisional scaffolding.

SUMMARY OF THE INVENTION

An object of the present invention is to provide a housing for a closed circuit television camera which eliminates the above mentioned drawbacks thus allowing quick operations of assembly/disassembly of the internal components and quick adjustment.

Another object of the present invention is to provide a housing for a closed circuit television camera which may be obtained with the simple equipment of a work press.

A further object of the invention is to provide a housing for a closed circuit television camera which ensures total protection against air infiltration, dust and other external atmospheric agents.

Still another object is to provide a housing for a closed circuit television camera that can be applied rapidly on supports or commercial traverses without the necessity of employing supplementary accessories.

These objects are achieved according to the invention by providing a housing for a closed circuit television camera constituted by two parts which are counterposed and approached one to the other, wherein the upper part has a substantially convex configuration while the lower part has a substantially planar configuration. In more detail, the upper convex part functions as a cover while the lower planar part constitutes the base which supports the internal components of the housing.

BRIEF DESCRIPTION OF THE DRAWINGS

These and other characteristics of the invention are described in detail by reference to a particular embodiment provided by way of a non-limiting example, by reference to the drawings of which:

FIGS. 1 and 2 show lateral perspective views of a housing for a closed circuit television camera of the invention, in condition of use:

FIG. 3 shows a perspective view of the housing of FIG. 1 in the open position; and FIG. 4 shows a frontal view of the housing of FIG. 1.

DETAILED DESCRIPTION OF THE INVENTION

As shown in the drawings, the housing of the invention indicated as a whole with numeral (1) is composed of two parts (2) and (3) which are counterposed one to the other, hinged laterally by means of hinges (4) and held approached one to the other by means of lateral locks (5).

The fundamental characteristic of the invention consists of the fact that the upper part (2) has a convex section and functions as a cover for the lower part (3) which is planar and which eventually is provided with a circumferential border (6). This border only slightly protrudes from the base (7) and provides the seat for the perimetrical seal, when the housing is closed.

As shown in FIG. 3, the internal components of the housing are applied on the planar base (7) such as the transformer (8) and slide (9) for support of the television camera (10).

The advantages both constructive and in use are well understood from FIG. 3 which shows that the assembly of the several components is quick, because they are placed on a single plane. FIG. 3 shows that access to all the components is easy when the housing is open as a book.

A further advantage of the constructive form of this invention derives from the fact that the front window or glaze (11) necessary for the external pickup is applied on the upper art (2) thus constituting a single body with the movable part.

The housing is completed with cap (12) as a cover for the protection from atmospheric agents.

Obviously embodiments different from the embodiment which has been described are possible, without however departing from the scope of the attached claims.

What is claimed is:

1. A housing for a closed circuit television camera which houses the television camera, a slide to support the camera, a transformer, a feeder, a heat dissipator ventilator for cooling, and necessary electrical connections between the several components and an external connection, said housing comprising an upper part (2) having a convex section hingedly connected by means of hinges (4) to a lower part (3) having a substantially planar base (7), said lower part (3) having a circumferential border (6) disposed on the same plane as said base (7) and slightly protruding from said base (7), said circumferential border (6) forming a perimetrical seal with said upper part (2) when the housing is closed, and lateral locks (5) for securing said upper part to said lower part, said camera, transformer, feeder, and heat dissipator ventilator are supported on said substantially planar base (7) whereby easy access to the several components is afforded when said convex upper part (2) is hingedly moved with respect to said lower part (3).

2. The housing for a closed circuit television camera according to claim 1, wherein a frontal glaze (11) necessary for the external pickup is applied on said upper part (2) and constitutes a unitary structure with the movable upper part.

3. The housing for a closed circuit television camera according to claim 1, which further comprises a cap (12) as a cover and/or a protection against atmospheric agents.

* * * * *